US008688344B2

(12) United States Patent  
Remlinger

(10) Patent No.: US 8,688,344 B2  
(45) Date of Patent: Apr. 1, 2014

(54) METHOD FOR RECUPERATING KINETIC ENERGY OF A MOTOR VEHICLE IN A OPTIMUM WAY IN TERMS OF ENERGY

(75) Inventor: Wolfram Remlinger, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/878,483

(22) PCT Filed: Sep. 29, 2011

(86) PCT No.: PCT/EP2011/004855  
§ 371 (c)(1),  
(2), (4) Date: Apr. 9, 2013

(87) PCT Pub. No.: WO2012/045409  
PCT Pub. Date: Apr. 12, 2012

(65) Prior Publication Data  
US 2013/0197714 A1   Aug. 1, 2013

(30) Foreign Application Priority Data  
Oct. 9, 2010 (DE) ........................ 10 2010 048 103

(51) Int. Cl.  
G06F 7/70    (2006.01)  
G06F 19/00   (2011.01)  
G06G 7/00    (2006.01)  
G06G 7/76    (2006.01)

(52) U.S. Cl.  
USPC ...... 701/70; 701/1; 701/36; 701/78; 303/138; 303/155; 340/426.32

(58) Field of Classification Search  
USPC ............. 701/1, 36, 45, 48, 70–74, 78–84, 93; 188/137, 138, 140 R; 303/138, 303/151–153, 155; 340/425.5, 426.32, 479  
See application file for complete search history.

(56) References Cited

U.S. PATENT DOCUMENTS

2011/0015819 A1*  1/2011  Goto et al. ...................... 701/29  
2013/0090822 A1*  4/2013  Schwindt ........................ 701/70

FOREIGN PATENT DOCUMENTS

| DE | 10141805 | 5/2002 |
| DE | 102007010188 | 9/2008 |
| DE | 102008015046 | 9/2008 |
| DE | 102007018733 | 10/2008 |

(Continued)

OTHER PUBLICATIONS

International Search Report for PCT/EP2011/004855, mailed Jan. 4, 2012, 3 pages.

(Continued)

*Primary Examiner* — Rami Khatib  
(74) *Attorney, Agent, or Firm* — Staas & Halsey LLP

(57) ABSTRACT

So that kinetic energy of a motor vehicle is recuperated in an optimum way in terms of energy, after a target point for braking or initiation of braking by the motor vehicle driver during travel of the motor vehicle has been detected, an optimum braking distance is determined insofar as the energy which can be recuperated is concerned, and a signal for the vehicle driver is generated which informs the driver the form of the measure which he has to perform in order to brake the vehicle or during braking of the vehicle for braking to actually occur over the optimum braking distance and for kinetic energy to be recuperated in an optimum way. The method combines the calculation of optimum operating states with autonomy of the vehicle driver during braking.

16 Claims, 1 Drawing Sheet

(56) References Cited

FOREIGN PATENT DOCUMENTS

| DE | 102008000131 | 7/2009 |
|---|---|---|
| DE | 102008024622 | 11/2009 |
| DE | 102009014352 | 9/2010 |
| DE | 102010048103.3 | 10/2010 |
| EP | 1923291 | 5/2008 |
| EP | 2275314 | 1/2011 |
| WO | 2010/046733 | 4/2010 |
| WO | PCT/EP2011/004855 | 9/2011 |

OTHER PUBLICATIONS

German Office Action for Priority German Patent Application No. 10 2010 048 103.3, issued on Mar. 2, 2011, 4 pages.
Written Opinion for PCT/EP2011/004855, 13 pages.

* cited by examiner

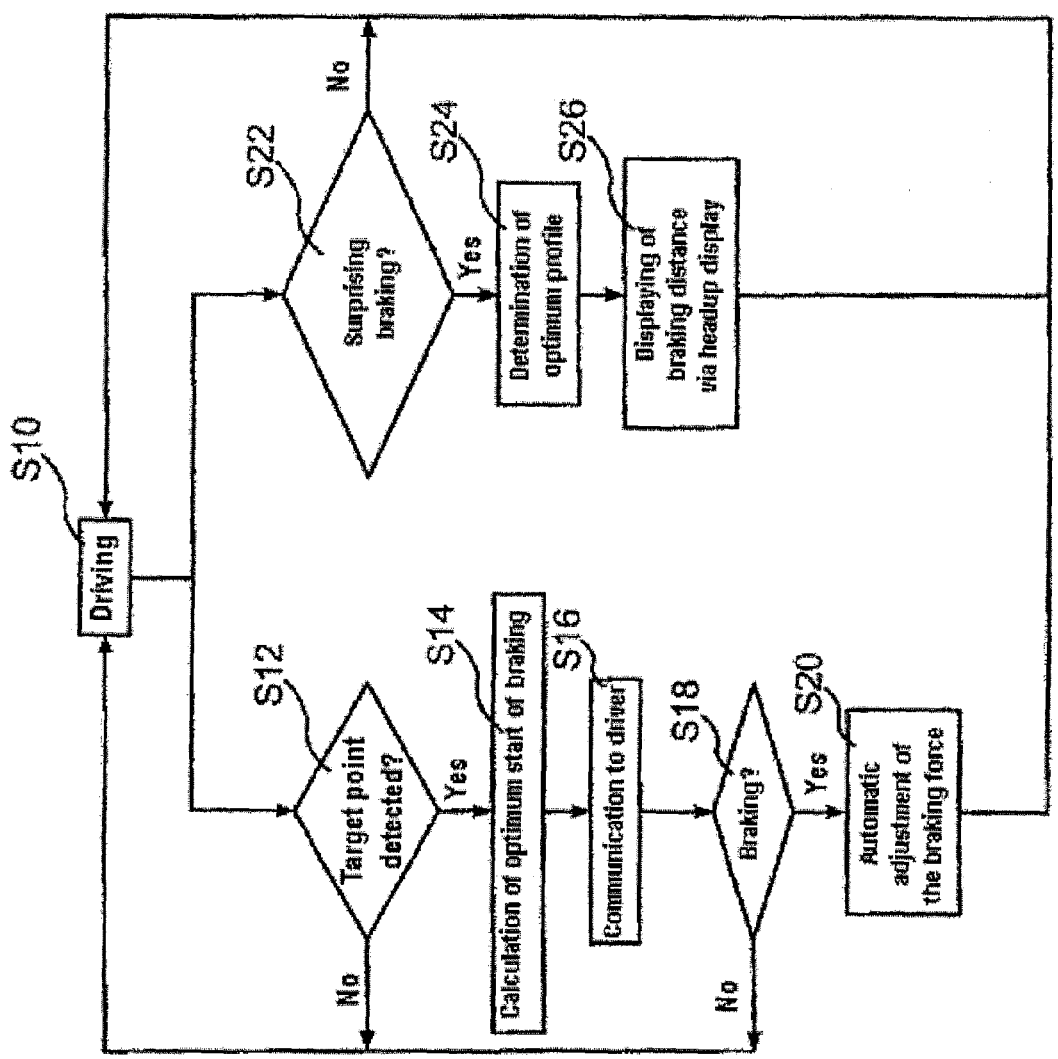

METHOD FOR RECUPERATING KINETIC ENERGY OF A MOTOR VEHICLE IN A OPTIMUM WAY IN TERMS OF ENERGY

CROSS REFERENCE TO RELATED APPLICATIONS

This application is based on and hereby claims priority to International Application No. PCT/EP2011/004855 filed on Sep. 29, 2011 and German Application No. 10 2010 048 103.3 filed on Oct. 9, 2010, the contents of which are hereby incorporated by reference.

BACKGROUND

In operating a motor vehicle, kinetic energy of the motor vehicle may be converted into electrical energy. This is referred to as recuperation of kinetic energy. Recuperation can be used in a motor vehicle with exclusively electric drive, wherein during the recuperation process an electric machine operates as a generator or the drive can be used in a motor vehicle with a hybrid drive application if, therefore, an internal combustion engine and a further drive in the form of an electric machine together form the drive of the motor vehicle.

In the context of the open-loop and/or closed-loop control of a hybrid drive it is known to provide open-loop or closed-loop control of a hybrid drive in a motor vehicle predictively on the basis of a communication of the motor vehicle with positionally fixed and/or moving opposite parties by selecting an operating strategy. The operating strategy can, as an operating state, also differentiate and set, inter alia, the recuperation of braking energy.

In the case of motor vehicles which are operated exclusively or largely with an electric drive, a significant feature is the range, such as how far the motor vehicle can travel, without an electrochemical energy accumulator (a battery) of the motor vehicle having to be connected to a terminal (outside the motor vehicle) and charged.

During braking, energy is lost in the form of thermal energy. By recuperation, a proportion of the kinetic energy can, however, be converted into forms of energy which permit subsequent use in order to operate the motor vehicle. The recuperation process usually increases the range of the motor vehicle. Quite specific severity of braking (measured as a negative acceleration) during which the recuperation process is optimal, will then occur; a specific quantity of energy per time unit (power density) can be input into an energy accumulator, and given excessively severe braking more kinetic energy is obtained from the motor vehicle than can be stored simultaneously in the energy accumulator, and in the case of excessively weak braking the braking distance is too long.

It is to be assumed here that the braking process can be optimized. Methods for optimizing such a braking process are known, for example from DE 10 2007 010 188 A1 and DE 10 2008 024 622 A1. This involves, in particular, the activation or deactivation of brakes and brake circuits.

SUMMARY

One potential object is to permit recuperation of kinetic energy of a motor vehicle in an optimum way in terms of energy.

The inventor proposes a method in which, when at least one predetermined condition during the travel of the motor vehicle is met, a braking distance which is optimum with respect to the energy which can be recuperated is determined, and a signal for the vehicle driver is generated, by which signal it is communicated to the vehicle driver, with respect to at least one measure for braking or during braking of the vehicle, what form this braking is to be carried out in for braking to be carried out over the optimum braking distance.

In the method it is at least assumed that the energy which can be recovered per unit of time is converted into a braking distance as a function of the instantaneous speed of the motor vehicle. For this purpose, the vehicle driver is prompted to brake precisely in such a way that the vehicle can recuperate the greatest possible quantity of kinetic energy. The signal which is generated for the vehicle driver therefore helps the vehicle driver to operate the motor vehicle in an optimum way in terms of energy.

The proposed method intentionally permits the vehicle driver to maintain a large degree of autonomy, and the braking distance which is optimum one in terms of an energy balance is actually not always the best because there are reasons outside the energy considerations: in one situation the vehicle driver will wish to brake relatively sharply in order to avoid a danger, and on another occasion he will perhaps not brake at all even if the predetermined condition prescribes braking for the motor vehicle.

Compliance with the predetermined conditions can be determined by the motor vehicle itself on the basis of external circumstances, for example also on the basis of a communication with objects external to the vehicle, or this can be based on an operator control action of the motor vehicle.

In both cases, there is a reason to brake and therefore to perform recuperation: either the motor vehicle determines on the basis of external circumstances that braking should occur or the driver of the vehicle has already brought about the braking. Given a suitable configuration, the predetermined condition can therefore be selected such that during all possible braking processes recuperation in an optimum way in terms of energy is made possible with the involvement of the vehicle driver.

In one preferred embodiment, the signal which is generated for the vehicle driver informs the driver when and where the braking process should be started. For example, an acoustic signal in a specific time sequence can communicate when braking is to be performed. An optical signal, for example using a contact-analogous headup display, can indicate a location on the roadway for the vehicle driver at which the braking process must be started.

The signal preferably even indicates to the vehicle driver the entire braking distance. In particular this distance can be displayed by the headup display. Displaying a bar diagram on the windshield of a motor vehicle by a headup display is known per se. By using such bars or similar display techniques, it is possible to provide the vehicle driver with a diagram in which he sees virtual marks on the roadway. For example, the end of the braking distance can be emphasized as the end of the specified bar or the like so that the vehicle driver can aim at this end during braking.

Alternatively, a braking force which is to be applied can be indicated to the vehicle driver by a signal. For example, a reference signal can be output and an additional signal can be output which is dependent on the braking force which is actually applied, and by comparing the two signals the vehicle driver can then apply a braking force which corresponds to the reference signal and at which recuperation is carried out in an optimum way in terms of energy. This is possible both with acoustic and with optical signals, for example by the pitch or the length of a bar diagram.

As an alternative to displaying the entire braking distance or communicating the braking force which is to be applied, the braking force can also be set automatically by the motor vehicle once the vehicle driver has started braking in accordance with the communicated signal. Here also, braking is carried out over the optimum braking distance when the motor vehicle correspondingly sets the braking force automatically.

The method is used when the motor vehicle identifies a target point for braking when, for example, owing to a wireless transmission of signals the motor vehicle "knows" that an upcoming traffic light on the route is at red. The optimum braking distance is then calculated in such a way that it ends at the target point. In this case, the predetermined condition is therefore determined by the motor vehicle itself.

As an alternative, the predetermined condition can be provided by the actuation of the brake by the vehicle driver himself, and the method is therefore initiated by such activation of the brake. Here also, the brake force of this motor vehicle can then subsequently be set automatically or else be indicated to the vehicle driver, and in precisely this way the entire braking distance which would follow after the starting of the braking in an optimum way in terms of energy can also be indicated.

The energy which can be input into an energy accumulator per unit of time can be dependent on the charge state of the energy accumulator. For this reason, the charge state of that battery into which energy is fed during the recuperation process is preferably taken into account during the determination of the optimum braking distance.

A negative gradient or a positive gradient of the roadway and/or a coefficient of friction of the roadway can equally well be determined during the determination of the optimum braking distance. This information is either known from a map (for example in the navigation system of the motor vehicle) or it is continuously or briefly measured after the initiation of the proposed method.

BRIEF DESCRIPTION OF THE DRAWINGS

These and other objects and advantages of the present invention will become more apparent and more readily appreciated from the following description of the preferred embodiments, taken in conjunction with the accompanying drawing, in which the single FIGURE is a flow diagram explaining the proposed method.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

The proposed method starts, according to step S10, with the fact that a motor vehicle is driving. The motor vehicle is intended to be one in which there is a possibility of recuperating its kinetic energy, wherein typically an electric drive in the form of an electric machine operates, in a reversal of its customary effect, as a generator which generates current, wherein the current is conducted into an energy accumulator from which the energy for operating the electric drive and/or other users is then made available later. The energy accumulator may be an electrochemical battery or a capacitor ("Supercap"), and also may equally well be a flywheel or may operate with compressed air or hydraulically.

During the driving of a motor vehicle, continuous checking is to be carried out here by the motor vehicle to determine whether a braking process is to be initiated. This takes place here in that the motor vehicle checks according to step S12 whether a target point, up to which braking has to take place, is detected. For example, it is possible to communicate in a wireless fashion to the motor vehicle, for example, by an infrastructure installation, such as, for example, a set of traffic lights, road sign with a speed limit or the like, that braking has to take place; equally well, another vehicle can be detected as an obstacle by vehicle-to-vehicle communication or measurement with a camera. Until a target point is detected, the vehicle carries on driving. As soon as a target point is detected, according to step S14 an optimum start of braking is determined. Then, according to step S16 a communication is issued to the driver to the effect that he has started the braking process. For example, successive beeping tones which occur at ever shorter intervals and which become a continuous tone can communicate a target point to the vehicle driver. Equally well, a headup display in the motor vehicle can indicate a location on the roadway at which the optimum start of braking takes place, from the driver's point of view.

In step S18 the motor vehicle then checks whether the driver has actually initiated a braking process. If this is not the case, the motor vehicle carries on driving quite normally. If the motor vehicle driver has initiated a braking process, according to step S20 automatic adjustment (application) of the braking force takes place in such a way that the motor vehicle can recuperate as much of its kinetic energy as possible. The motor vehicle therefore brakes over a braking distance which is optimum in terms of energy. It is then possible to drive on.

Independently of the checking in step S12, in step S22 the motor vehicle determines whether the vehicle driver himself has (surprisingly) initiated a braking process. As long as this is not the case, the motor vehicle carries on driving normally. If a case of surprising braking has been determined in step S22, in step S24 the optimum profile of the braking process is determined. In the present case, the optimum profile is obtained by virtue of the fact that braking is carried out with a specific braking force, with the result that a specific braking distance occurs. The resulting braking distance (which is optimum in terms of energy) is then communicated to the vehicle driver via a headup display: For example a bar is simply projected onto the windshield in such a way that the vehicle driver detects this bar as lying in a virtual fashion on the roadway and the end of the bar as marking the end of the braking process. The experienced driver can brake the motor vehicle in such a way that he comes to rest at precisely the end of the bar. He has then braked in substantially an optimum way in terms of energy.

The motor vehicle can then be driven on as before.

The method can also be implemented sensibly when just one of the two branches which start with the step S12 or the step S22 is run through. Further possible ways of bringing about a communication to the vehicle driver in such a way that kinetic energy of the motor vehicle is recuperated in an optimum way in terms of energy, that is to say how it can be communicated to the vehicle driver which measure he has to take in order to operate the motor vehicle in order to recuperate energy in an optimum way, are conceivable. The execution of the measure will not per se always be possible because there are circumstances during the driving of a motor vehicle which are outside the optimization of energy. For example, in city center road traffic there can always be an obstacle on the roadway in front of which it is necessary to brake more quickly than the motor vehicle considers necessary. Likewise, an obstacle may possibly also be driven around without braking having to take place.

If the method is implemented continuously during the operation of a motor vehicle, sufficiently reasonable driving of the vehicle will permit the range of the motor vehicle to be increased compared to motor vehicles in which the proposed method is not used.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for recuperating kinetic energy of a motor vehicle in an optimum way in terms of energy, comprising:
   when at least one predetermined condition is met during movement of the motor vehicle, determining an optimum braking distance which is optimum with respect to the energy recovery; and
   generating a signal for a driver of the vehicle, the signal communicating to the driver of the vehicle, with respect to at least one measure for braking or during braking of the motor vehicle, a form of braking to be carried out to achieve the optimum braking distance.

2. The method as claimed in claim 1, wherein
   the vehicle identifies a target point for braking, and
   the optimum braking distance ends at the target point.

3. The method as claimed in claim 2, wherein the signal communicates when or where the braking is to be started.

4. The method as claimed in claim 1, wherein
   the at least one predetermined condition is the vehicle receiving a wireless signal containing information regarding a required stop point, and
   the optimum braking distance is calculated to end at the required stop point.

5. The method as claimed in claim 1, wherein
   the at least one predetermined condition is the vehicle detecting an obstacle with a camera, and
   the optimum braking distance is calculated to end before the obstacle.

6. The method as claimed in claim 1, wherein the at least one predetermined condition is activation of brakes by the driver of the vehicle.

7. The method as claimed in claim 1, wherein the signal symbolically indicates to the driver of the vehicle, the vehicle travelling along the optimum braking distance.

8. The method as claimed in claim 1, wherein
   the signal symbolically indicates to the driver of the vehicle via a headup display, the vehicle travelling along the optimum braking distance.

9. The method as claimed in claim 1, wherein the signal indicates to the driver of the vehicle, a braking force which is to be applied.

10. The method as claimed in claim 1, wherein
    at least first and second signals are generated,
    the first signal informs the driver of the vehicle, of an actual braking force, and
    the second signal informs the driver of the vehicle, of an optimum braking force that will achieve the optimum braking distance.

11. The method as claimed in claim 10, wherein the first and second signals are acoustic signals.

12. The method as claimed in claim 1, wherein the vehicle automatically applies a braking force that will achieve the optimum braking distance.

13. The method as claimed in claim 1, wherein
    kinetic energy recuperated from the vehicle is fed to a battery, and
    a charge state of the battery is taken into account in determining the optimum braking distance.

14. The method as claimed in claim 1, wherein
    the vehicle travels along a roadway having a negative or positive gradient, and
    the negative or positive gradient of the roadway is taken into account in determining the optimum braking distance.

15. The method as claimed in claim 1, wherein
    the vehicle travels against a force of friction characterized by a coefficient of friction of the roadway, and
    the coefficient of friction of the roadway is taken into account in determining the optimum braking distance.

16. The method as claimed in claim 1, wherein
    the vehicle travels along a roadway having a negative or positive gradient,
    the vehicle travels against a force of friction characterized by a coefficient of friction of the roadway, and
    the negative or positive gradient of the roadway and the coefficient of friction of the roadway are taken into account in determining the optimum braking distance.

* * * * *